United States Patent

Schindler

[15] 3,699,566

[45] Oct. 17, 1972

[54] DELTA CODER

[72] Inventor: Hans R. Schindler, Steinacherstrasse 85, Aargaw, Switzerland

[22] Filed: Oct. 16, 1970

[21] Appl. No.: 81,489

[30] Foreign Application Priority Data

Oct. 16, 1969 France......................6935813

[52] U.S. Cl...........340/347 AD, 325/38 B, 332/11 D

[51] Int. Cl...............................................H03k 13/22

[58] Field of Search......340/347 AD, 347 DD; 325/38 B; 332/11 D

[56] References Cited

UNITED STATES PATENTS

| | | | |
|---|---|---|---|
| 3,461,244 | 8/1969 | Brolin | 325/38 B X |
| 3,500,441 | 3/1970 | Brolin | 325/38 B X |

*Primary Examiner*—Maynard R. Wilbur
*Assistant Examiner*—Joseph M. Thesz, Jr.
*Attorney*—Hanifin and Jancin and Robert Bruce Brodie

[57] ABSTRACT

An analog to digital converter in which the instantaneous difference between each successive analog signal sample magnitude and a corresponding reference magnitude is digitally encoded. A feedback loop having non-linear reference setting means automatically increases or decreases the reference magnitude responsive to the match or mismatch condition of a predetermined number of output digital signals. The reference setting means includes the pulse width modulating of control signals in the feedback loop to provide accurate control of the non-linear reference magnitude variations. The direction of change is determined by the digital output signal polarity. However, if a predetermined succession of output digits match, then a first exponential time rate of change is used in incrementing the reference level. Otherwise, exponential incrementing occurs at a second time rate of change.

5 Claims, 4 Drawing Figures

INVENTOR
HANS R. SCHINDLER

BY Robert Bruce Brodie

ATTORNEY

FIG. 3 DELTA MODULATOR DECODER

DELTA CODER

BACKGROUND OF THE INVENTION

This invention concerns a delta-coded modulation transmission system having quantization step sizes varying continuously according to an exponential law.

The development of the digital techniques and the advantages inherent to their simplicity have been at the origin of the development of the methods for coding and decoding analog signals to be transmitted. In this field, the simplest system, i.e., the one which requires the less expensive installations on both transmission and reception sides, is undoubtedly the system which makes use of the delta-modulation principle. As in any digital transmission systems, the analog signal is sampled at the transmitter side at clock controlled intervals. The level measured at each sampling time-instant is encoded and transmitted as digital pulse combinations. A delta-modulation system is a type of digital encoding which in addition, encodes only the variation in the analog level between two successive sampling instants. Each sample is compared to a reference and the relative magnitude is encoded as one of only two binary levels. The sample magnitude is compared to the previously considered level. The binary level is indicative of whether the analog level is being approximated by positive or negative steps. Accordingly, the transmitter sends say, a binary data "1", in the case of a negative going approximation, and a binary data "0", in the case of a positive going approximation. Therefore, the delta-modulation system has the advantage of simplicity in both encoding and decoding. On the other hand, a delta modulation system has the disadvantage of also being responsive to "white" noise. As a result, it cannot accurately encode the analog information having rapid amplitude due to noise as well. The method and apparatus with which it is possible to solve the "white", or idle, noise problem is disclosed in French Pat. No. 6,935,777 issued on June 14, 1971, and also in the IBM Technical Disclosure Bulletin, Volume 13, No. 6, November, 1970, at pages 1,564–1,565.

Systems have already been proposed which solve the fidelity problem for coding signals with rapid variations in amplitude. Such systems proceed by using variable quantization levels. Indeed, as long as the comparison between the present and previous levels is indicative of a negative going approximation, the quantization level used to form the present level for approximating the real value of the input analog data is increased according to a given law. When the respective condition of the levels is reversed, said quantization level, on the contrary, is decreased according to a second given law. The advantage of such a system is that is makes it possible to proceed to a more precise coding operation of the steep-edged analog signals without increasing the ratio of the utilized bits. Therefore, such a system realizes a perfectly controlled modification of the quantization signal, a modification which is carried out according to a predetermined law of which the delta decoder has to take into account in order to recover the original information.

The delta-modulation transmission systems of the above type use a logarithmic law for the variations in the quantization step sizes. Indeed, the economy of bits realized when passing from the PCM type modulation system (pulse-coded modulation system) to the delta-type modulation system, is made to the detriment of the signal/noise ratio. Studies have shown that the PCM type modulation system makes it possible to obtain an approximately constant signal/noise ratio for a wide range of levels of the analog signal to be coded.

Delta-type modulation systems also make it possible to obtain a relatively constant signal/noise ratio due to the use of said logarithmic law. be However, the result can be improved if the logarithmic variation in the quantization step size has a finer increment. The proposed systems of the prior art have not only been comparatively complex, but they have given an increment with a discontinuous and rough variation.

SUMMARY OF THE INVENTION

The object of this invention is to devise a delta-type modulation transmission system the quantization step level of which varies according to a step-generated exponential law, the fineness of said steps being predetermined in a very simple manner.

The device according to the invention makes use of a quantization step size generator with an exponential variation having the variations in the slope of the transfer function dependent on the ratio of two fixed value capacitors, only. The signal produced by said generator is then utilized to modulate the width of the pulses that ensure the control of the change in the reference level generated by the feedback loop and compared to the incident analog level.

More particularly, the invention contemplates exponentially changing the reference level in the feedback path of a delta modulator. The direction of change is that of the output digital signal. However, the time rate of changes varies. That is, if a predetermined succession of output digits *match*, then a first time rate of change is used. Otherwise exponential incrementing occurs at a second time rate of change.

DESCRIPTION OF THE PREFERRED EMBODIMENT

Figure 1:
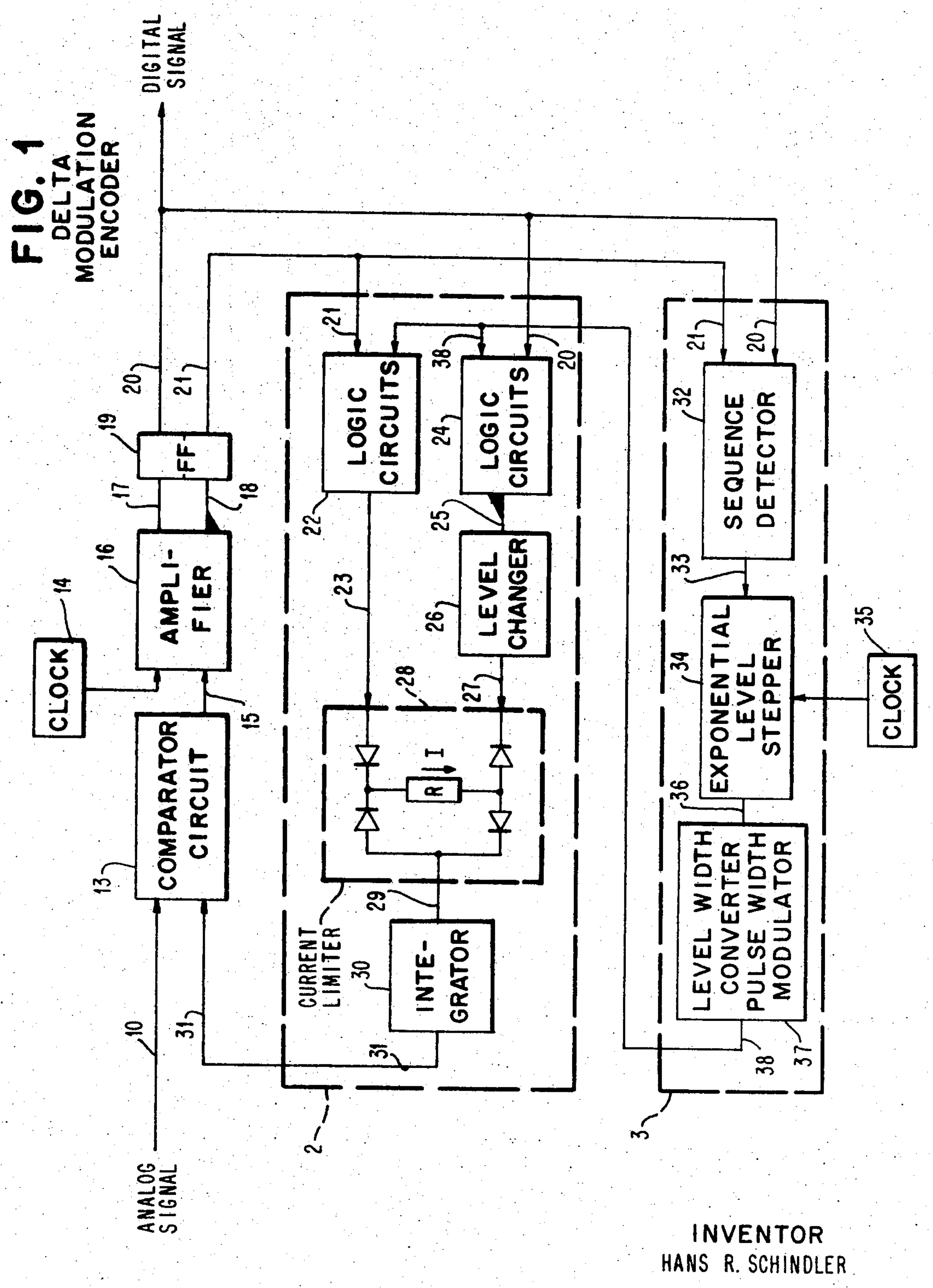
FIG. 1 is a schematic block diagram of a coder according to the invention.

The delta modulator of this invention shown in FIG. 1 includes a comparing element for comparing the analog signal to be coded with a reference signal, a bistable circuit which determines whether the difference between these signals is positive or negative, and a feedback loop which changes the output digital signal of the coder into a reconstructed analog signal which alters the reference signal. The modulator according to the invention includes also a second feedback loop, the so-called control loop, which ensures the control of the operation of the feedback loop of the delta coder itself. The analog signal applied to the delta modulator input is a signal which may continuously assume all the positive and negative values within a given range of values.

Referring now to FIG. 1, there is shown a block diagram of the modulator. An analog signal is applied to comparing circuit 13 through input line 10. This comparator 13 includes a second input terminal 31 to which the altered reference signal is applied. Comparator 13 has an output terminal 15 onto which there appears a signal representative of the relative magnitude difference between the signals applied to comparator 13. The comparator 13 is connected through a line 15 to a logic circuit 16 which fulfills the logic AND function. This AND circuit receives the clock signals applied through line 14, onto its second terminal. Logic circuit 16 has two output lines 17 and 18. Signals representative of A ≥ B appear on line 17 whereas the signals representative of A < B appear on line 18, A being the analog signal magnitude and B being the reference signal magnitude. Lines 17 and 18 are connected to the two inputs of a bistable circuit 19. This bistable circuit 19 is of a well-known type. It has two output lines 20 and 21. The digital signals which may assume the binary values "1" or "0" flow through lines 20 and 21. Line 20 is also the output line of the delta modulator of the invention.

The feedback loop of the delta modulator is shown in the dash-line block 2, and constitutes a digital to analog converter. This feedback loop includes two logic circuits 22 and 24 which respectively fulfill the logic AND and inverted AND functions. AND circuit 22 has two input terminals; the first input terminal is connected to bistable circuit 19 through line 21. AND circuit 22 has an output line 23 which is connected to a current limited 28. Circuit 24, which ensures the logic inverted AND function, has two input terminals; the first terminal is connected to bistable circuit 19 through line 20. This circuit 24 is connected to a level changing stage 26, through line 25. Stage 26 is connected to current limiter 28, through line 27. Level changing stage 26 is of a well-known type; it ensures the adaptation of the level of the signal appearing on line 25 from the logic circuit 24 for its application to current limiter 28.

Current limiter 28 is a floating circuit; therefore, it has no point connected to ground. Said circuit 28 is of a well-known type; the illustration including diodes and a current limiting element (for instance, diode of the FET type) is given by way of an example only, and is not limitative in itself. Current limiter 28 is connected to an integrating network 30, through line 29. Integrating network 30 is of a well-known type. It is comprised of passive, resistive and capacitive elements; it ensures the integration of the current pulses arriving on line 29. The signal coming from integrating network 30 appears on output line 31. Line 31 is connected to the second input of comparator 13. The analog reference signal flows over said line 31, which is representative of the positively- or negatively-approached analog input signal.

The delta modulator of this invention has a control loop represented by the dash line block 3 for sensing the digital output condition of the modulator and developing an appropriate control signal for modifying the digital to analog converter. The control loop includes a sequence detector 32, and is, in turn, driven by the output from bistable circuit 19. The sequence detector 32 may be formed from a shift register of any well-known type. Sequence detector 32 operates in such a manner that an output appears on its output line 33 when a given number of pulses representative of bits "1" or "0" has appeared. Thus, in this embodiment, the chosen algorithm is such that a positive level output signal is generated over line 33 when four successive bits "1" or bits "0" have appeared. Line 33 is connected to circuit 34 with which it is possible to obtain the exponential variation in the quantization level. Fro convenience, this circuit 34 is called to exponential level stepper. This stepper will be described further on with respect to FIG. 4.

Clock signals are applied to said stepper 34, through line 35. Stepper 34 produces a signal on output line 36, which signal has an amplitude varying according to an exponential law. The amplitude of this output signal on line 36 increases according to a first exponential law whereas the amplitude thereof decreases according to a second exponential law. It is obvious that the variations in amplitude may be continuous or discrete, i.e., they appear according to steps. Likewise, the variations in amplitude may be considered as appearing in a discrete manner while the amplitude is increasing and in a continuous manner while the amplitude of said signal is decreasing.

Exponential stepper 34 is connected to a level-width converter 37. The level-width converter may be a pulse width-modulator. Such a converter 37 changes the level of the signal applied to its input 36 into an output pulse, the width of which is a direct function of said input signal level. The output of circuit 37 is connected to logic circuit 22 through line 38, and to logic circuit 24.

Figure 2:
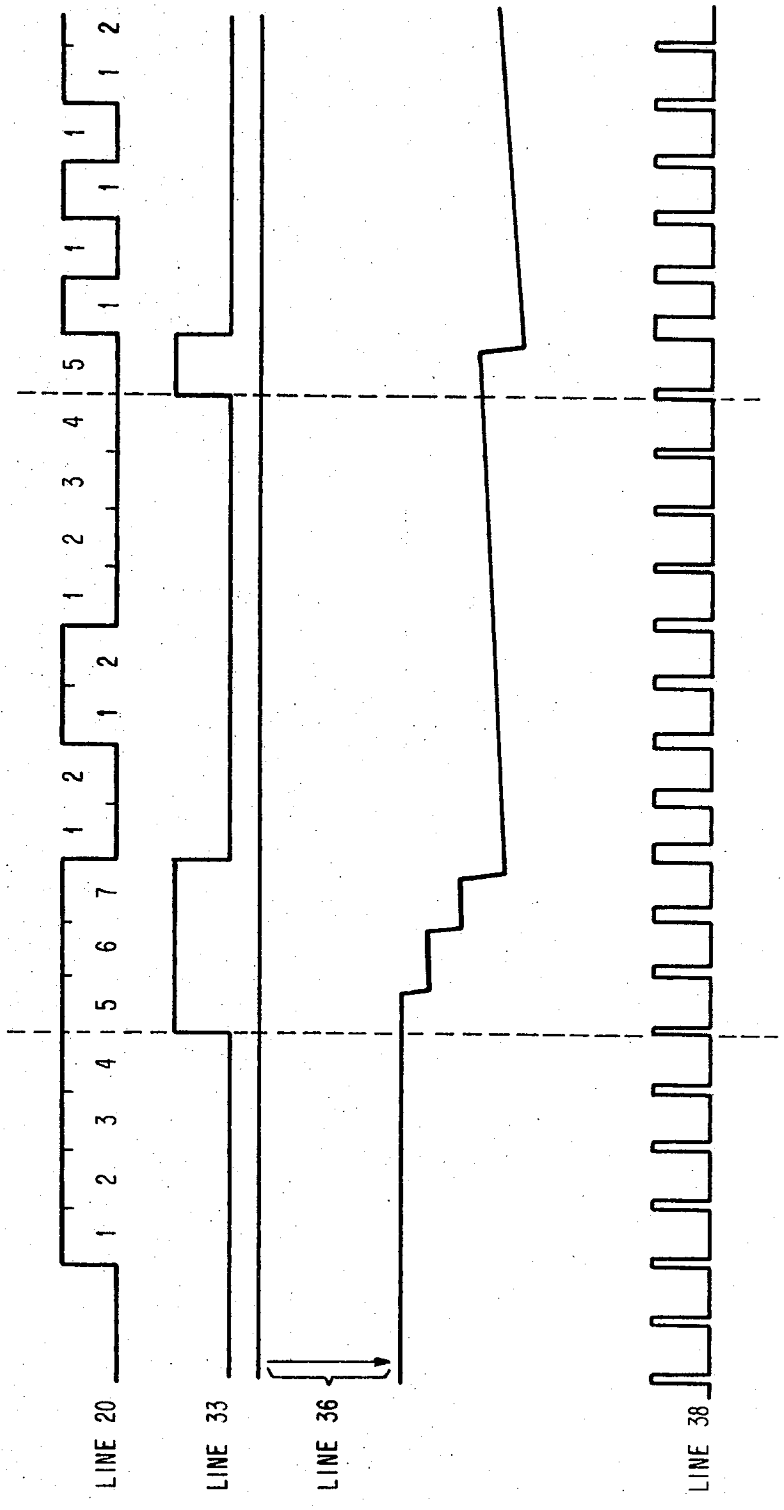
FIG. 2 is a diagram of the signals obtained by means of the coder of FIG. 1, and taken from different points in the circuit.

Reference to FIG. 2 shows signals picked up at different points in the modulator. It is assumed that an analog signal to be coded is applied to the first input of comparator 13, through line 10; it is further assumed that the second input of said comparator 13 receives a reference signal, through line 31. As seen above, the reference signal coming from the delta coder feedback loop either is greater or less than the analog input signal. Comparator 13 produces an output signal on line 15, which is representative of the sign of the difference between the values of the analog signals applied to these inputs. As logic circuit 16 receives clock signal 14, it ensures the transfer of the output signal of comparator 13 to bistable circuit 19, through lines 17 and 18. Bistable circuit changes its state according to its previous state. The coder output signal, which is the signal appearing on line 20, is shown in FIG. 2 beside the indication "line 20". Therefore, the delta coder output signal may assume two levels: a high level and a low level. The reference numbers inserted into the middle of the signal shown in FIG. 2, line 20, correspond to the number of clock pulses during which the output signal assumes the same state. Thus, the output signal assumes the high level during seven clock pulses, and then the low level during two pulses, then the high level during two pulses, the low level during five pulses, etc...

As seen above, the output signals over lines 20 and 21 are applied to sequence detector 32 of the control loop of said coder. In the algorithm here considered, the sequence detector produces a positive level output signal on line 33 when four pulses of the same type, i.e., four bits "0" or four bits "1", are produced by bistable circuit 19. The output pulse width of the sequence detector is a function of the succession of bits "1" or "0" of the output signal of the coder. Indeed, the operation of sequence detector 32 is such that it changes its state when one of the two following cases, appears. The first case corresponds to the fact that four successive bits "1" or bits "0" are produced by bistable circuit 19. The output pulse width of said sequence detector is a function of the succession of bits "1" or bits "0" of the output signal of the coder. The second case corresponds to an interruption of the sequences of bits "1" or bits "0" of the output signal of the coder, i.e., to a transition in the sequences of bits "1" and bits "0", in so far as said interruptions sequences are separated from the previous interruption sequences over than more four clock times. In FIG. 2, the reference "line 33" corresponds to the output signal of sequence detector 32. The initial state of the sequence detector is represented by a low level; said detector 32 changes its state and brings the output level to a high level after the reception of four successive bits "1". As seen above, sequence detector 32 changes its state anew, since the sequence interruption, after seven clock times, follows the previous sequence interruption over more than four clock times. Afterwards, two pulses corresponding to bits "0" are received by detector 32 but they do not change its output level. Likewise, two other pulses corresponding to bits "1" are received, but for the same reason, they do not change the output level of detector 32. Another sequence of five bits "0" may be assumed. Sequence detector 32 receives four pulses corresponding to bits "0", thus modifying its output level. After reception of the fifth bit "0", the sequence of the output signal of the coder is interrupted and sequence detector, therefore, changes its state. The next binary signals applied to the input of the sequence detector are bits "1" or bits "0" and, therefore, do not change the state of the sequence detector. It is obvious for the man skilled in the art that, as seen above, any other algorithm might be used. The choice of the algorithm used here limits, by no means, the scope of the invention.

Figure 4:
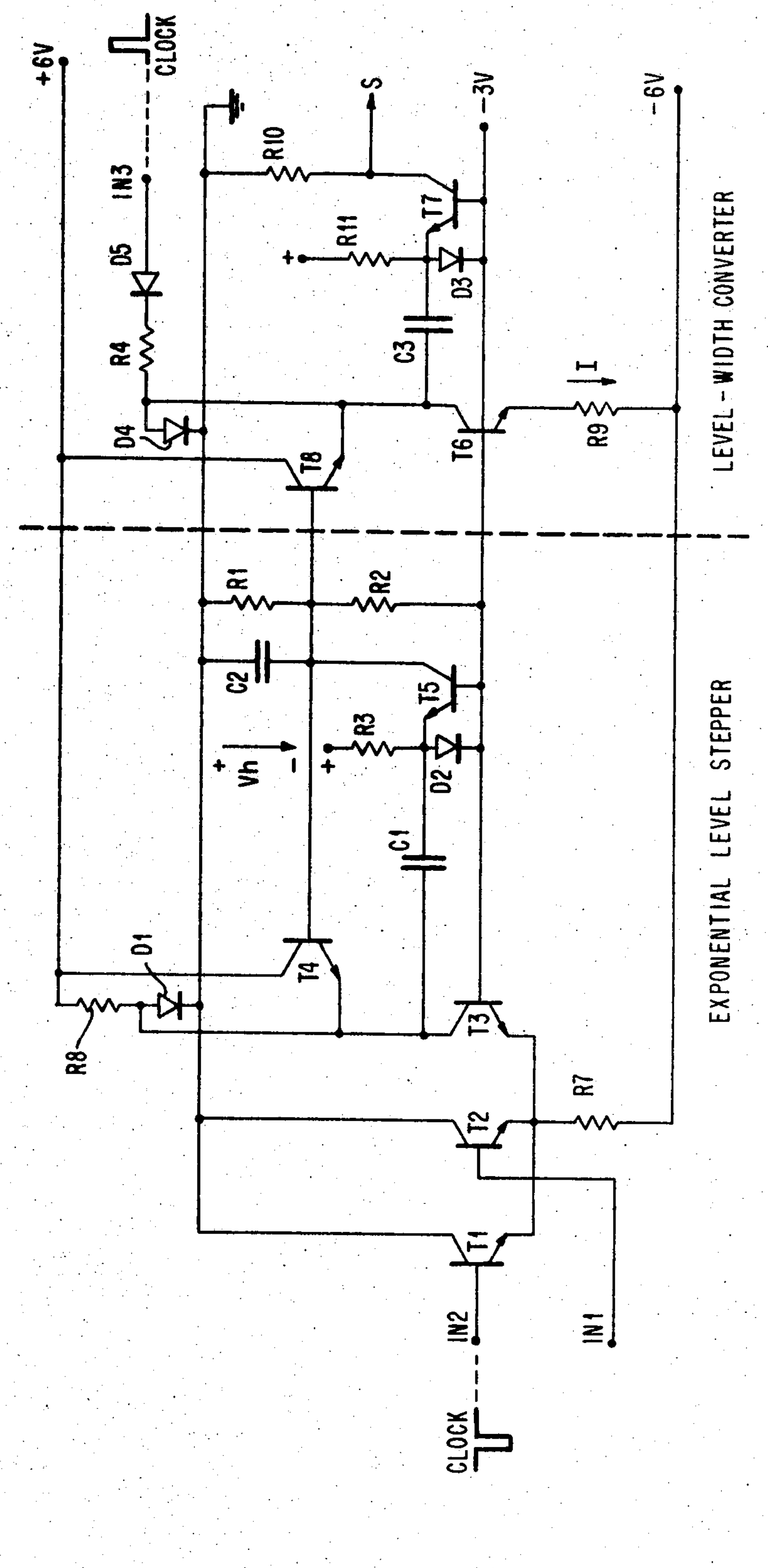
FIG. 4 is a schematic diagram of the circuits with which it is possible to obtain the exponential variation in the quantization level as well as said width-modulation of the pulses intended to control the feedback loop of the delta coder.

The operation of the exponential level stepper 34 will now be given. Beside the reference "line 36", shown in FIG. 2, there is the representation of the variations in the output signal of stepper 34, which appears on line 36. On the left hand side of FIG. 2, the output signal shows variations in amplitude of zero value; this corresponds to the case when short sequences of bits "1" and "0" appear on the output line of the delta coder. Indeed, such short sequences do not change the state of sequence detector 32 and the value of the output signal on line 33 remains at a low level during a long time period. Under such circumstances, stepper 34 is released and produces a signal of a constant amplitude. When, after reception of four bits "1" by sequence detector 32, the output signal on line 33 is at a high state, stepper 34 is energized in the exemplified embodiment of the invention. The energization of stepper 34 corresponds to the fact that, upon each clock pulse applied to line 35, the amplitude of the output signal appearing on line 36 increases in an exponential manner. This exponential increase, which occur by steps, is obtained by adding a constant fraction to the amplitude value of the output signal of stepper 34, when energized. The implementation with which it is possible to obtain the exponential increase of the amplitude of the output signal is shown in FIG. 4. The variation in the amplitude of the output signal on line 36 corresponds to the variation in the voltage picked up at the terminals of a capacitor. When sequence detector 32 changes its state because of the interruptions of the sequences of bits "1" or bits "0" in the output signal of the delta coder and when its output signal on line 33 changes from high to low level, the charge at the terminals of the capacitor which is part of stepper 34, stops increasing, and, on the contrary, decreases according to a second exponential law corresponding to the discharge of a capacitor in a resistor. As seen above, the amplitude increase of the output signal 36 is realized by steps according to a first exponential law, whereas the amplitude decrease is realized continuously according to a second exponential law. After the sequence of seven bits "1", when a short sequence of bits "0" or "1" appears, the amplitude of the output signal on line 36 therefore decreases according to the second exponential law and this, until stepper 34 receives a high level signal at its terminals, through line 33. As soon as a clock pulse is received on line 35, the amplitude of the output signal on line 36 increases in an exponential manner all the time during which the signal on line 33 assumes a high level; in the chosen example, this time duration corresponds to a bit time. After this sequence of five bits "0", the coder output signal is represented by a succession of bits "1" and bits "0", so that the sequence detector does not change its state and that the output level of stepper 34 decreases according the second exponential law until the minimum level is reached.

The variations in the amplitude of the signal on line 36 are applied to the level-width converter 37. According to a well-known manner, the pulses produced by circuit 37 are of a width which is directly proportional to the amplitude of the signal on line 36. In FIG. 2, beside the reference "line 38", these variable width pulses are shown. The width of such pulses is constant when the amplitude of the signal on line 36 is constant; it increases when the amplitude increases and decreases when the amplitude decreases.

The variable width pulses are applied to logic circuits 22 and 24 of the feedback loop 2 of the coder, through line 38. A positive or negative current is applied to integrating network 30, through current limiter 26 with respect to the signal on line 38 and the output signal from the delta coder. The time necessary for the current to flow, in either direction, corresponds to the width of the pulses transmitted by control loop 3 through line 38. Due to the variation in the width of the pulses on line 38, according to exponential laws, the electric charge transmitted over line 29 will vary, too, according to an exponential manner. The quantization level is not only variable but it still varies according to an exponential law. As it is well-known in the coder technique, the variations in the analog signal to be coded more rapidly than in the coders wherein the quantization level is constant.

Figure 3:
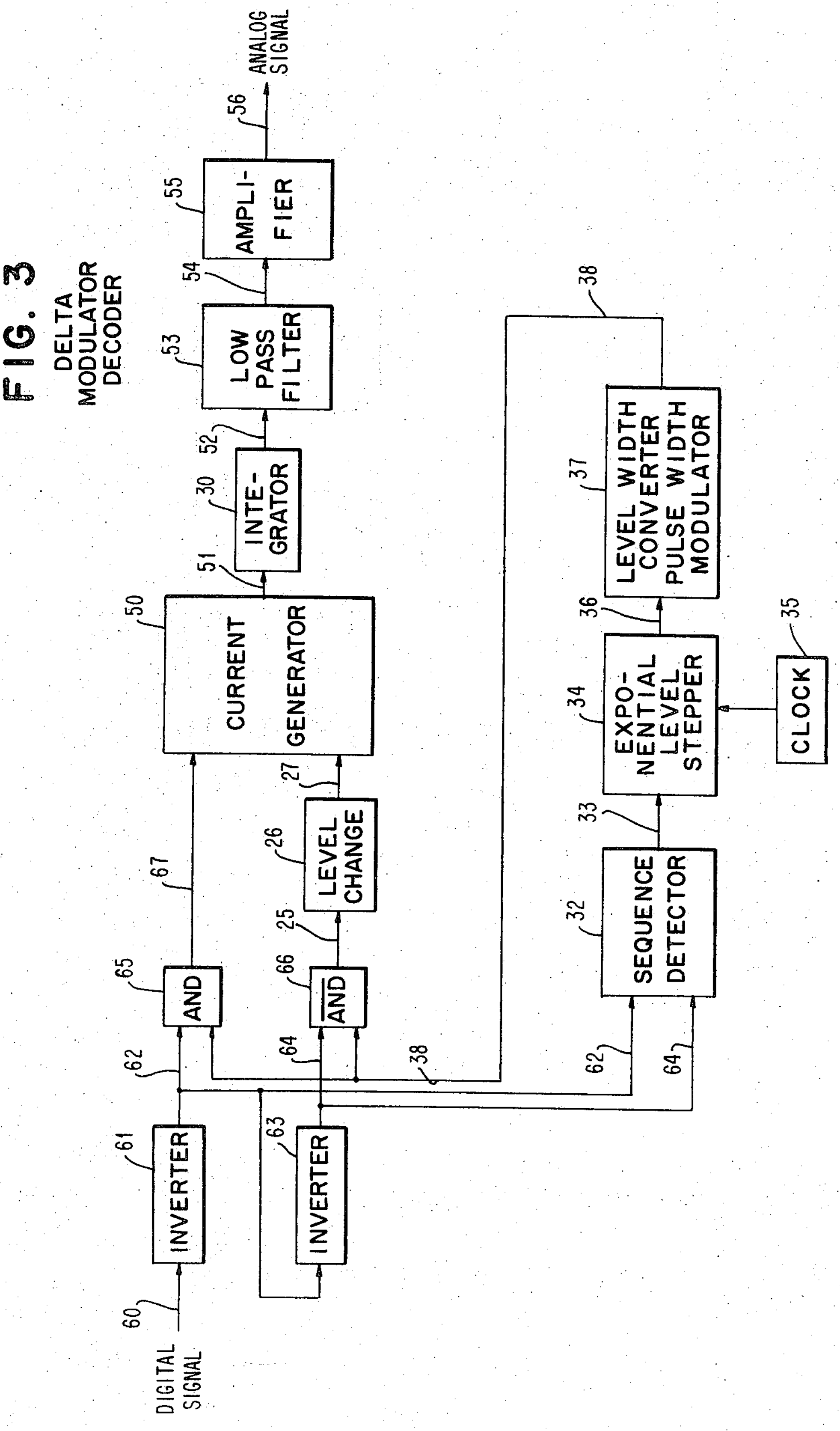
FIG. 3 is a schematic block diagram of the decoder according to the invention.

In order to recover the analog signal from the binary signals appearing on output line 20, a decoder must be used. This decoder may be of the conventional type, well-known per se, which includes a single quantization step size. Under these circumstances, the assembly made up with the delta coder having a plurality of quantization step sizes which is the subject of this invention together with a decoder having a single quantization step size, fulfills the dynamic companding function. It may also be of advantage to make use of a decoder which removes said dynamic companding function. Such a decoder is illustrated in FIG. 3. In this figure, an input line 60 for receiving the digital signal transmitted by the delta coder according to the invention, is connected to a logic INVERT circuit 61. Output line 62 connects the output terminal of circuit 61 to the input terminal of a second logic circuit 63 which fulfills the same INVERT function. Two output lines 62 and 64 connect circuits 61 and 63 to logic circuits 65 and 66, respectively. Circuits 65 and 66 fulfill the AND and AND-INVERT functions, respectively. They have each a second input terminal connected to a line 38. Circuit 65 is connected to a current generator 50, through line 67. Circuit 66 is connected to current supply 50 through line 25 and level changing state 26. This current supply 50 is arranged in such a way that it supplies, say, a positive current under the control of a signal received through line 67 and a negative current under the control of a signal received through line 27. The current coming from current supply 50 is transmitted to an integrating network 30 of the well-known type, through line 51. The integrating signal is transmitted to low-pass filter 53 through line 52. The output of the low-pass filter is connected to amplifier 55, through line 54, the output terminal of said amplifier being connected to the output line 56 of the decoder.

The decoder is provided with a feedback loop. This loop includes a sequence detector 32 receiving the input signals through lines 62 and 64. The operation of said sequence detector is identical with the sequence detector of the coder shown in FIG. 1. The output signal from said detector is transmitted to an exponential level stepper 34 through line 33. Clock pulses are applied to said exponential level stepper through line 35. The output signal of stepper 34 is transmitted to a level width converter 37 identical with the one shown in FIG. 1. Its output signal is transmitted to line 38 connected to logic circuits 65 and 66.

The operation of said decoder is very similar to the operation of the coder shown in FIG. 1. Indeed, the digital signal received on line 60, after its transmission through logic circuits 61 and 63, appears in the form of inversed sign pulses on lines 62 and 64, respectively; for instance, positive pulses appear on line 62 and negative pulses appear on line 64. The sequence detector 32 determines, as seen above, the four-bit sequences of a same bit type, i.e., four bits "1" or four bits "0". The exponential level stepper produces a signal at its output 36 the amplitude of which varies exponentially. This exponential variation occurs according to a first exponential law when the amplitude increases and according to a second exponential law when the amplitude decreases. As seen above, the converter 37 transforms the level of the signal received at its input into a pulse the width of which is proportional to the amplitude of the received signal. The variable width pulses appearing on line 38 therefore, control current supply 50 through logic circuits 65 and 66. Consequently, current supply 50 supplies the integrating network with a current the direction and time-duration of which are a function of the information received on lines 62 and 64 and of the control signal applied to line 38.

The exponential level stepper 34 of fIGS. 1 and 3 will now be described in more details. A first transistor T2 of the NPN conductivity type has its collector connected to ground. Its emitter is connected to a negative supply terminal, say −6 volts. The base of said transistor T2 receives the output signals from the sequence detector. A second transistor T3 of similar conductivity type is arranged in such a way that its emitter is connected to the emitter of transistor T2 whereas its collector is connected to a positive supply, say 6 volts through a resistor R8. The collector of said transistor T3 is also connected to ground through a diode D1 of a polarity such that the collector of transistor T3 remains always slightly positive with respect to ground. The base of transistor T3 is connected to a supply current, say −3 volts. A transistor T1 is connected in parallel with transistor T2. Said transistor T1 has its collector connected to ground, its emitter connected to the emitter of transistor T2, whereas negative clock pulses are applied to its base. The time-length of said clock pulses is about 4 milliseconds, which is perfectly appropriate for a 56 kilobaud transmission. Between ground and the −3v supply, two resistors R1 and R2 are series-mounted. A capacitor C2, here the so-called hold capacitor, is mounted between ground and the point common to resistors R1 and R2. A transistor of the same conductivity type as transistors T1 through T3 is utilized. Its base is connected to the −3V supply; its collector is connected to the ungrounded terminal of the capacitor C2; its emitter is connected to the collector of transistor T3, through a capacitor C1, here the so-called pump capacitor. The emitter of said transistor T5 is brought to a slightly positive voltage with respect to its base. In order to make that emitter positive with respect to its base, resistor R3 and diode D2 are series-mounted. This series-mounting is connected between a positive voltage supply, not shown, and the −3v supply. The point common to resistor R3 and diode D2 is connected to the emitter of said transistor T5. Another transistor T4 of the NPN conductivity type is also provided, with its base being connected to the common point of resistors R1 and R2, its collector, to the +6v supply, and its emitter to the collector of transistor T3.

The operation of the exponential level stepper will now be explained.

When said stepper receives an answer from the sequence detector, it increases the voltage level at the terminals of hold capacitor C2 according to a given factor, say, 1 decibel. This increase occurs for each clock pulse until a transition appears in the output signal of the delta coder. As seen before, the voltage picked up at the terminals of capacitor C2 determines the amplitude of the output signal of the exponential level stepper. When a transition appears in the output signal of the coder, the voltage at the terminals of capacitor C2 decreases according to an exponential law. In quantization levels therefore decrease slowly according to a given determined time constant, for instance, 10 milliseconds, to finer quantization level sizes.

It is supposed that the output signal of the delta coder is formed of short sequences of bits "1" and "0". Consequently, it is supposed that the output signal of the sequence detector is low during at least 10 milliseconds. The output signal of the sequence detector appearing on line 33 is applied to the base of transistor T2. The level of this signal is taken as being equal to −2 volts when the sequence of bits "1" or bits "0" is lower than four bits, in the chosen example. Under these conditions, transistor T2 is made conducting while transistors T3, T4 and T5, are not. Thus, the voltage at the terminals of hold capacitor C2 is minimum and determined by resistive network R1 and R2. The coder operates with its smallest possible quantization step sizes. This operation goes on util a sequence of four bits "1" or four bits "0" is generated at the output of the delta coder. This operation corresponds to the left part of FIG. 2.

When a four-bit sequence of similar type is picked up at the output of the delta coder, the voltage of the signal on line 33 passes from −2 volts to −4 volts. Transistor T2 becomes non conducting. When a negative clock pulse appears, transistor T1 is made non conducting so that transistors T3 and T5 become conducting. In addition, diodes D1 and D2 are reversely biased. The switch operation causes a variation in the voltage through pump capacitor C1, which variation is equal to the hold voltage Vh since the collector voltage excursion of transistor T3 is limited by transistor T4 being used as a limiter. Thus, a charge Q is pumped through capacitor C1 by means of transistor T5 in hold capacitor C2. The following equation may be written:

$$Q = C2\,(V'h - Vh) = V'h \cdot C1$$

where V'h is the voltage at the terminals of hold capacitor C2 after pumping. This means that, upon each pumping operation, the voltage at the terminals of the hold capacitor increases by a factor equal to $K = C2/(C2 - C1)$. Since factor K is determined by the ratio of the values of capacitors C1 and C2, K is independent of the variations which may occur in the values of capacitors C1 and C2, variations due, for instance, to the ageing of the components.

It will now be supposed that the output signal of the sequence detector assumes back a low level, which corresponds to a sequence interruption in the succession of bits "1" or "0" of the output signal of the coder. Hold capacitor C2 then is discharged in resistors R1 and R2 with a time constant, in the chosen example, equal to 10 milliseconds. Under these conditions, the quantization level decreases slowly until its minimum value. This is shown in FIG. 2 beside the reference "Line 36".

The level width converter 37 will now be described. It is shown on the right part of FIG. 4. It includes a transistor T6 of the NPN conductivity type with its base being connected to the −3V supply. Its emitter is connected to the −6v supply, through resistor R9. Its collector is connected to a positive clock signal generator by means of resistor R4 which is series-mounted with diode D5. The mounting of such a diode D5 is such that it passes the positive clock pulses to the collector of transistor T6. The collector of transistor T6 is connected to ground through a diode D4 limiting the voltage excursion of the collector of transistor T6. A transistor T7 of the NPN type is provided. Its base is connected to the −3v supply; its collector is connected to ground by means of resistor R10. The signals which appear at the terminals of resistor R10 are variable width pulses generated by the level width converter 37 of FIG. 1. The emitter of transistor T7 is connected to the collector of transistor T6, through a capacitor C3. In order to bring the emitter of transistor T7 to a positive potential with respect to the base of the same, resistors R11 and a diode D3 are used, which are series-mounted. This series-mounting is connected between a positive supply, not shown, and the negative −3v supply. The point common to resistor R11 and diode D3 is connected to the emitter of transistor T7. A third transistor T8 is used, which operates as a limiting transistor. Its base is connected to the common point of resistors R1 and R2 of the exponential level stepper. Its collector is connected to the +6v supply. Its emitter is connected to the collector of transistor T6.

The operation of the level-width converter is as follows. Current I which flows through resistor R9 charges capacitor C3. When there is no clock pulse, the collector voltage of transistor T6 is equal to $Vc = -Vh - \delta$, where $\delta$ is the base-emitter voltage drop of transistor T8. Since transistor T7 is off, when the clipping level is obtained and diode D3 is directly biased, the voltage at the terminals of diode D3 with respect to the −3v reference voltage is : $Vd = +\delta$. When a positive clock pulse is applied to input IN 3, the collector voltage of transistor T6 increases by $+\delta$, transistor T6 grows non-conducting and capacitor C3 is charged through diode D3 and resistor R4. On the contrary, when the clock pulse disappears, output transistor T7 grows conducting and a current I flows through capacitor C3 since diode D5 and transistor T8 are not conducting. Voltage Vc at the terminals of capacitor C3 decreases linearly up to level −Vh; at this moment, transistor T8 grows conducting anew and transistor T7 grows non conducting. Thus, the total charge transferred by capacitor C3 is:

$$Q' = C3 \cdot Vh$$

Since current I is a constant current, the width of output pulse ΔT is proportional to hold voltage Vh, according to formula:

$$\Delta T = C3 \cdot Vh/I = (C3/I) \cdot Vh$$

The level-width converter then, fulfills the required function for the operation of delta coder.

A number of modifications in this present embodiment can be envisaged. As seen already, the variations in the output signal amplitude of the exponential level stepper appearing on line 36 can be no more discrete, as shown in this embodiment, but they can be continuous. The important point is that this variation in the continuous level is made according to an exponential law.

Another embodiment of this invention may consist in utilizing a sawtooth generator which is connected to output line 33. This generator produces a linear ramp signal with a first slope each time the output signal on line 36 assumes a high level and a linear ramp signal with a second slope each time the output signal on line 33 assumes a low level. Under these conditions, a saw-tooth signal appears on line 36 which has teeth of variable height with respect to the sequences of bits "1" and "0" gathered at the output of the delta coder in order to obtain an exponential variation in the width of the pulses transmitted on line 38, a level-width converter is used the transfer function of which is no more of the linear type but of the exponential type.

In the embodiment just described, the output signal appearing on line 38 is time-modulated so that the current applied by means of line 20 to integrating network 30 flows for a more or less long time period in either direction. Another embodiment of this invention may consist in making use of a control loop which is provided with a sequence detector, an exponential level stepper and a level current converter. In that case, the current applied to the integrating network is a current of variable intensity according to an exponential law. The polarity of the signal is determined in a way similar to that used in the previous embodiment by the output signal of the delta coder. The intensity of the current is determined in absolute value by the exponential level stepper. The level current converter may be either of the active type, i.e., a current generator which produces a current which is a function of a control signal, or of the current limiting type wherein a current of more or less intensity is formed with respect to the control signal; this may be, for instance, a photo-diode which passes a constant current determined by the intensity of the received light.

It is clear that the previous description has only been given as an unrestrictive example and that numerous alternatives may be considered without departing from the spirit and scope of the invention.

I claim:

1. A delta modulator comprising:

a reference signal source (30);

a clock signal source (14, 35);

a comparator digitizer means (10, 13–21) including:

means (10, 13, 15, 16, 31) coupling the reference and clock sources for providing a relative magnitude indication between an applied analog signal magnitude sampled at the clock rate and the level of the reference signal; and means (17–21) for providing a first digital signal indication (20) for each analog magnitude exceeding the reference level, and for providing a second digital signal indication (21) for each analog magnitude not exceeding the reference level; and a digital to analog converter in feedback relation to the comparator digitizer and including:

reference level setting means (22–29) coupling the reference source for selectively and incrementally varying the reference level in a first and second magnitude direction responsive to first and second digital signal indications respectively; and means (3, 32–38) coupling the reference level setting means for non-linearly varying the reference level at a first time rate of change in the magnitude direction corresponding to each digital signal and for non-linearly varying the reference level at a second time rate of change responsive to the detection and duration of a succession of N identical digital signals in a magnitude direction corresponding herewith.

2. In a delta modulation encoder according to claim 1, wherein the means for non-linearly varying the reference level includes means (34) for exponentially varying said level.

3. A delta modulator comprising:

a reference signal source (30);

a clock signal source (14–35);

a comparator-digitizer means (10, 13–21) including:

means (10, 13, 15, 16, 31) coupling the reference and clock sources for providing a relative magnitude indication between an applied analog signal magnitude sampled at the clock rate and the level of the reference signal; and means (17–21) for providing a first digital signal indication (20) for each analog magnitude exceeding the reference level, and for providing a second digital (21) for each analog magnitude not exceeding the reference level, and a digital to analog converter in feedback relation to the comparator digitizer and including:

reference level setting means (22–29) coupling the reference source for selectively and incrementally varying the reference level in a first and second magnitude direction responsive to first and second digital signal indications respectively; and means (32) responsive to a succession of N identical digital signal indications for generating a first control signal for the duration of the succession of at least N signals and for generating a second control signal otherwise; means (37, 34, 35) for producing a sequence of pulses whose relative widths vary exponentially in one direction at a first time rate of change responsive to the first control signal, and whose relative widths vary exponentially in the other width direction at a second time rate of change responsive to the second control signal; and means (22–29) for incrementally varying the reference level proportional to the variation in successive pulse widths and in the magnitude direction associated with the corresponding digital signal indications.

4. A delta modulator according to claim 3, wherein the means for producing width-modulated pulse signals comprise a charge storage circuit (4-C2, T5) for charging through a first path (T5, C2) defining a first time constant responsive to the first control signals, and for discharging through a second path (C2, R1, R2) defining a second time constant responsive to the second control signal.

5. A delta demodulator comprising:

a digital to analog converter for incrementally varying a first and second magnitude direction, an output signal magnitude level responsive to respective first and second digital signal indications;

means (62, 64, 32) responsive to a succession of identical digital signal indications for generating a first control signal for the duration of the succession and for generating a second control signal otherwise;

means (33, 38) for producing a sequence of pulses whose relative widths vary exponentially in one direction at a first time rate of change responsive to the first control signal and vary exponentially in the other width direction at a second time rate of change responsive to the second control signal; and means (65, 66, 67, 25–27, 50, 51, 30) for incrementally varying the output signal magnitude level proportional to the variations in successive pulse widths and in the magnitude direction associated with the corresponding binary signal indication.

* * * * *